MAGNETIC TAPE RECORDING OF TYPEWRITER KEYBOARD DATA

Original Filed Nov. 14, 1962 4 Sheets-Sheet 1

Sept. 24, 1968 J. D. MISLAN ET AL 3,403,225

MAGNETIC TAPE RECORDING OF TYPEWRITER KEYBOARD DATA

Original Filed Nov. 14, 1962 4 Sheets-Sheet 2

Sept. 24, 1968 J. D. MISLAN ET AL 3,403,225

MAGNETIC TAPE RECORDING OF TYPEWRITER KEYBOARD DATA

Original Filed Nov. 14, 1962 4 Sheets-Sheet 4

United States Patent Office 3,403,225
Patented Sept. 24, 1968

3,403,225
MAGNETIC TAPE RECORDING OF TYPEWRITER KEYBOARD DATA

Joseph D. Mislan, Morrisville, Pa., assignor to Communitype Corporation, a corporation of Delaware
Continuation of application Ser. No. 237,598, Nov. 14, 1962. This application Dec. 7, 1967, Ser. No. 688,937
6 Claims. (Cl. 179—2)

ABSTRACT OF THE DISCLOSURE

An inter-office data communication system station comprises an office typewriter with input-output facilities and electronic circuitry linking the machine either directly to a tone-code receiver-transmitter and thereby to a standard voice telephone channel, or optionally via a magnetic tape recorder-producer for high-speed bit-parallel, word-serial storage and retrieval of typewriter keyboard operations. Provision is made for code parity checking, tape backspacing for error correction under keyboard control, local typing from tape records, error counting, and for various operation modes for text and data transmission, computer terminal use, and other applications.

This is a continuation of application Ser. No. 237,598, filed Nov. 14, 1962, and now abandoned.

This invention has to do with improvements in communication systems of the type in which data or information of the kind which can be encoded by a keyboard, such as a typewriter keyboard, is recorded as code sequences upon a suitable recording medium; the recording being at a suitable time played-back or reproduced over a transmission channel to a reception point. At the latter point, the incoming code sequences are either again recorded for subsequent control of a typewriter at that station, or can optionally be applied directly to a typewriter or to the input of other suitable data-processing equipment such as a computer.

It is a principal object of the invention to provide an improved system and equipment of this general type which will make the fullest use of modern data-handling technique by electronic means, and which will provide reliable interoffice data handling communication, and auxiliary features useful therewith, at relatively low cost considering the results achieved.

It is recognized that intercommunication by means of coded pulses generated by the operation of keyboards associated with page printer telegraph apparatus is accomplished by known teletypewriter systems, and that such known systems also include code-recording and reproducing auxiliaries which enable the storage of signals for interoffice transmission (and reception) according to the exigencies of traffic conditions, or to suit the needs of users. While the present invention is in a sense directed to the satisfaction of the same general or ultimate requirements, it is characterized by differences both as to detail and as to operating principles and features which in combination, or cooperatively, provide extensive and important advantages. These latter will best be understood from the following specific objects of the invention, which are so drawn as to provide a comparison with generally analogous prior-art systems so as to avoid a tedious repetition of the history of such prior art.

It is accordingly one specific object of the invention to provide a system of the kind mentioned above in which the inter-office communication link can be a conventional local or long-distance voice telephone circuit, rather than a specially designed and maintained telegraph circuit. The satisfaction of this object effects major economies and conveniences in installation and operation, not the least important of which is that said voice telephone channel or circuit remains available for speech communication whenever it is not in use for code transmission. The particular exemplary embodiment of the invention described below, for example, utilizes an existing code-transmission system of the type designated by the trademark "Dataphone," and described in the March 1962 issue of the Bell Laboratories Record.

A further specific object of the invention is to provide such a system in which the page-printing keyboard machine ultimately used as the code generating (and optionally as the receiving) device may be in essence a modern form of the ordinary electric office typewriter sold under the trade name "Selectric," provided with input-output features which simplify the keyboard selection of codes and sequences for transmission to other locations, and which also simplify their use in control of the page printing or typing operations at the said remote points. The codes utilized by the invention include not only the codes for letters, characters and symbols as provided in code form by the "Selectric" machine of the input-output type, but include also codes corresponding to non-printing functions of the machine, including the selection of upper and lower case, backspacing, forward or carrier spacing, tabulating, and carrier returning. The commercial typewriter of the kind mentioned does not directly provide these codes, and the invention therefore provides auxiliary means controlled by the corresponding key-operated contacts or switches of the machine, for generating such function codes.

Still another object of the invention is to provide, in such a system, simple code storing and retransmitting equipment uitilizing magnetic tape as the storage medium both for the temperorary storage of locally generated codes pending their later transmission over the telephone circuit, and for the interim storage of received codes pending their translation into forms suitable for data processing or to produce printed text by the typewriter, as described, at the receiving office. More specifically, the invention comprehends a system in which the magnetic tape steps a discrete amount to record each code bit of each selected or command code, the bits being recorded on the tape in serial order, and each code or sequence of bits normally comprising eight bits. Six of the bits will define the coded character or function, one bit will provide a parity check facility, and these will be preceded by a "start" bit. No stop pulse is required, and the system permits much higher rates of transmission than are possible with somewhat similar start-stop systems employed with previously known punched-tape perforators and reperforators of known typewriter systems with their associated noise, mechanical complexity, requirements for a continuous supply of bulky one-use paper tapes, special operator training, and so on.

An object of the invention which is directly related to the foregoing is the provision of a facility by which an operator preparing a magnetic tape record of typewriter operations may readily correct erroneously-selected codes, to the end that the message may later be transmitted accurately and at maximum speed; e.g., without the waste of transmission time associated with the presence of numerous "delete" codes as in known paper-tape systems.

A further object related to the two immediately preceding paragraphs is the provision of multipurpose transistorized data converting circuits connected between the typewriter and the recorder-producer and between the recorder-reproducer and the voice-coded signal transmitter and receiver, to effect the necessary signal conversion operations such as parallel-to-serial conversions and the like, and which also render compatible the timing characteristics of the various components. Among these latter are (1) the essentially random timing of manual typewriter keyboard operations, (2) the divergent operating-time requirements of the typewriter as between character-printing operations and purely functional operations such as line feeding, case-shifting and the like, (3) the divergent limits upon cycle repetition rates dictated by the design of the magnetic tape recorder-reproducer and the telephone line data system, and others.

Yet another object of the invention is to provide a system as above in which the aggregate of auxiliary equipment is minimized by the utilization of portions thereof to satisfy multiple or different functions in accordance with the immediate operating requirements: For example, the accomplishment of this object is contributed to in an important way by the employment of a magnetic type recorder-reproducer which is selectively used (1) for the indefinite storage of locally-generated code sequences pending their later transmission to a remote station, and used (2) for the indefinite storage of code sequences arriving from a remote station pending their later use in controlling the local typewriter to produce printed copy.

In brief, the invention provides for the interconnection over standard telephone circuits of office-style typewriters without interfering with the other intended or useful functions of such circuits and machines, and essentially without imposing special requirements thereon. The invention further provides, in such a combination, novel facilities for code storage and reproduction which overcome the limitations of prior designs directed to similar ends. Finally, the invention provides simple, quiet, compact, relatively inexpensive and highly reliable auxiliaries to accomplish the stated objects, making maximum use of solid-state electronic configurations and magnetic code recording and reproducing facilities.

A complete embodiment of a preferred form of the invention will be described below by way of example and illustration, so as to enable those skilled in the art to practice the invention, but without intention to thereby limit the full scope of the same as defined in the claims appearing at the end of this specification.

General

Figures 1, 2:
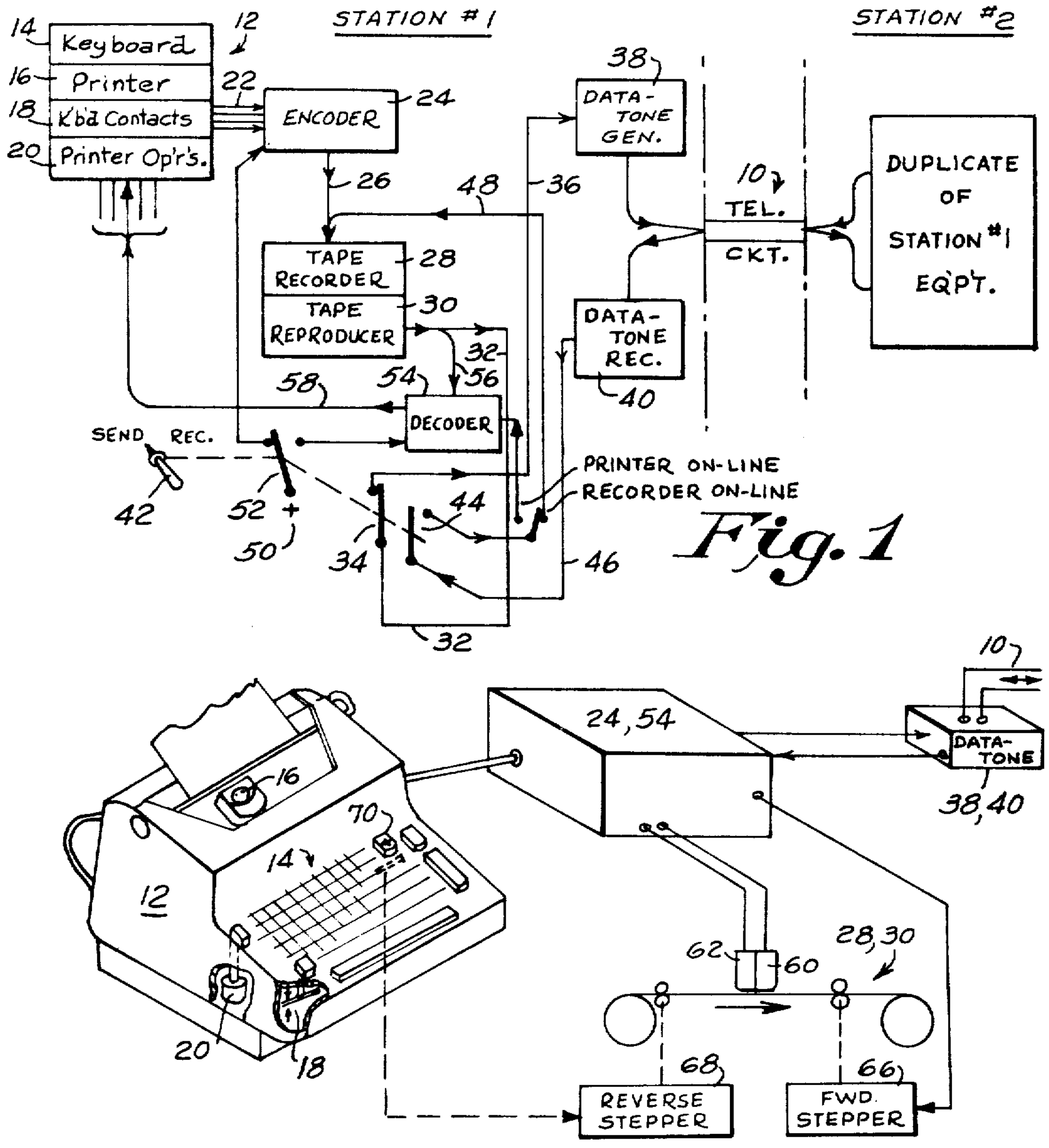
FIG. 1 is a simplified block diagram of the chosen embodiment of a complete system.
FIG. 2 is a similar diagram, with additional details, of the equipment of one station only of the system.

Referring first to FIG. 1 of the drawings, a typical two-station system is indicated functionally in block form, for two-way communication. The telephone circuit is designated by numeral 10, the apparatus to the left thereof being located at one station, and that to the right being at the other. Only the left station is shown in any detail, since the station equipments will be duplicates where two-way communication is desired. Otherwise, one station will require only transmitting equipment and the other only receiving equipment.

The equipment at the left station (Station #1) in FIG. 1 comprises mainly the "Selectric" typewriter 12 with the usual keyboard 14 and printer mechanism 16, typically as shown in U.S. Patent 2,879,876 of Palmer et al. Other suitable typewriters can be employed, and in any event are to include input-output auxiliaries (which are standard commercial equipment) indicated as a set of electrical code contacts 18 operated by each character key and a single contact operated by each function key. Such auxiliaries also include a set of printer operating solenoids or the like indicated at 20. Operation of the keyboard prints text as usual on paper inserted in the typewriter, and, when the station-to-station equipment is in use, the keyboard operated contacts supply current over conductors 22 (in the form of a six-bit code plus one parity check bit) to an encoder apparatus 24 to produce, at its output 26, final eight-bit codes (including for each the start pulse bit) corresponding to the respective keyboard operations. These 8-bit codes are recorded serially, on a magnetic tape, by tape recorder 28 associated with magnetic tape reproducer 30.

At any time after a sufficient number of codes sequences have been recorded, or when actual transmission to Station #2 is desired, the recorded tape is "read" (that is, its signals are reproduced) by reproducer 30, whose pulse output (at a selected speed which may be one suitable for printer control directly, or a much faster speed approaching the maximum bit-rate capacity of the available telephone line or channel) is conveyed over the channel 32, manual switch contacts 34, and channel 36 to the data-tone transmitter 38 which generates coded audio tones and applies them to telephone line 10. This audio tone generator 38 is a commercially available device known under the trademark "Dataphone" and described in the article mentioned above. The same remark applies to its companion audio-tone data receiver 40.

The possibility of using a very high recording speed at the receiving end of the line permits the new system to avoid the inherent speed limits of known punches, and permits the maximum use of the band width of available channels, since tape recording and reproduction at rates of as high as 1,000 bits per second, and upward, is technically feasible.

The data bits received at Station #2 out of the data-tone device are recorded for later use or may be conveyed directly to its input-output printer, or both simultaneously. It will be understood that direct control of the receiving printer is possible only when the bit-transmission rate is at the lower speed suitable for such machine control. Since the station equipments are identical, the receiving operation can also be followed by referring again to Station #1, with manual send-receive switch 42 in the opposite position from that illustrated. That switch operation opens the connection between channels or conductors 32 and 36 at contacts 34, and closes contacts 44 to connect the output of data-tone receiver 40 over channels 46, 48 to the recorder 28.

It will be noted that send-receive switch 42 selectively applies operating current (via contact 52) from source 50 either to the encoder 24 (for recording a tape to be transmitted) or to a decoder 54 (for decoding from a tape or directly from the line the signals which have been received).

Upon conclusion of a received message, indicated by a prearranged signal or otherwise, the tape reproducer 30 is operated to supply reproduced codes over channel 56 to the decoder 54 which converts them to proper form for application via channel 58 to the several control input leads of the printer character and function operating elements (solenoids) to cause the printer to type out the received message or data.

It is theoretically possible to connect typewriters over telephone or like circuits without the use of intermediate long-term storage as provided by the recorder-reproducers 28–30, but as a practical matter the system disclosed has important and even essential advantages. The storage system provides an optimum high and uniform pulse repetition rate for transmission purposes, as opposed to the slower and more or less random rate of keyboard operation; it enables the actual transmission to take place very rapidly when the telephone circuit (and receiving station) becomes available or free; and it presents the possibility of editing or correcting known errors in the tape, due to keyboard mistakes, before actual transmission occurs.

FIG. 2 shows a typical physical arrangement of the equipment at one station, the same numerals being applied as above. Thus, the typewriter or printer is indicated as a whole by numeral 12 with keyboard 14, printer (type ball) 16, key contacts 18 and keylever operators 20. The electronic coder and decoder are shown at 24, 54 in a single cabinet, and the tape recorder-reproducer is indicated by 28–30 with usual record-erase head 60, and reproducer head 62. The tape is arranged to be fed in either direction, one bit-space at a step, by drives 66 and 68, the reverse motion being controlled from backspace key 70 in a manner to be described below. The data-tone generator and receiver are shown in a common cabinet 38–40.

With the general features and functions above in mind, the detailed aspects of the invention will be more fully comprehended by considering, as though they were separate equipments, the transmitting, receiving and record-reproduce operations in turn. The transmitting flow diagram of FIG. 3 will be described first. However, it is to be noted that in the interest of specificity of disclosure, the selection of a particular printer (the "Selectric") has been made, and that certain operating features of this particular printer or typewriter require special operating features that are not essential to the utility of the invention in its broader aspect. For example, this particular printer does not operate code-permutation contact sets for functions such as carriage-return, tabulating, case shifting and the like, but merely provides a single normally-open contact which the key closes when depressed. Also, such a function as carrier-return may require a longer interval to complete than is required for each character imprint. Provisions of the associated equipment to accommodate such peculiarities may or may not be needed when other printers are employed.

Recording

Figure 3:
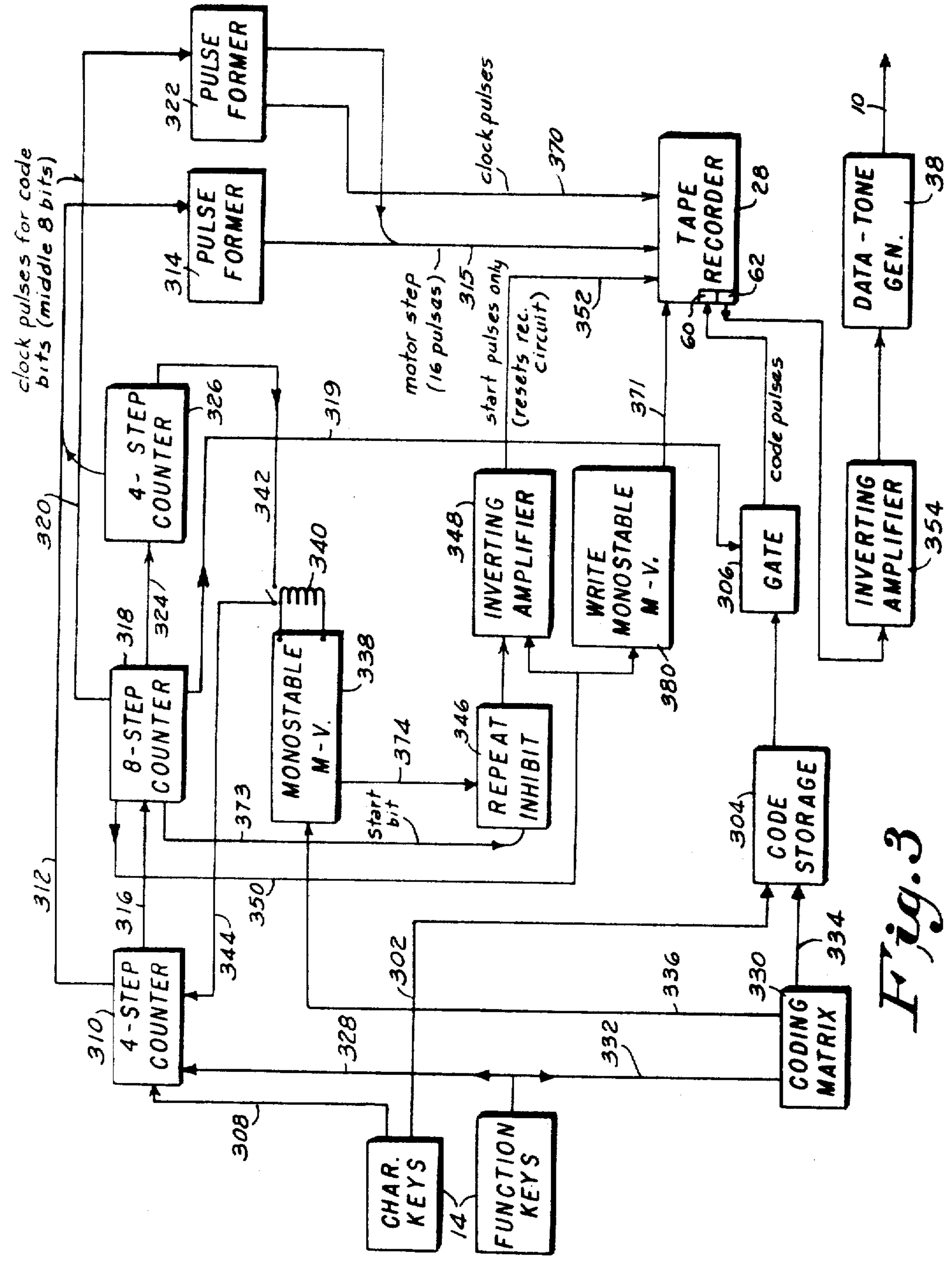
FIG. 3 is a still more detailed diagram of the transmitting portions of such a single station.

Refer now to FIG. 3, which diagrams the signal paths and operations of the equipment when recording. The operation of any character key of typewriter keyboard 14 operates a particular set of circuit contacts peculiar to that character. Since these contact closures (or openings) occur simultaneously, the keyboard output is essentially parallel coded, which is to be converted to serial-coded for recording. Also, the contacts do not remain operated for a predictably sufficient duration for reliable conversion to serial form. Accordingly, the contact circuit conductors 302 (part of the group 22 of FIG. 1) are applied to an interim storage buffer 304 which will ultimately convey them, in serialized order, through a gate circuit 306 and thence to the recording head of tape recorder 28.

Code spacing

A particular contact conductor 308 energized upon any character key operation initiates a counting cycle of a 4-step counter 310 which emits four pulses over lead 312 to a pulse former 314 that in turn supplies pulses over lead 315 to the tape forward drive stepper (66 in FIG. 2) to move the tape, bringing an unrecorded portion under the recording head and allowing the tape movement to become constant before recording the character. Counter 310, on completion of its fourth step, emits a pulse over conductor 316 to the 8-step counter 318, which via lead 319 triggers "on" gate circuit 306 eight times in succession, the gate thus passing the "on" or "off" pulses from the several flip-flop stages of storage 304 to the tape recorder head over lead 26.

Counter 318 also emits eight pulses in synchronism with the gate control pulses, these pulses being fed over conductor 320 to the tape step pulse former 322 which causes the tape to advance one code position for each bit from gate 306. At the same time the clock pulses are fed over conductor 370 to the recording circuits.

The Start Pulse (on line 350) also triggers the "Write

Monostable" 380 which enables the recorder write circuit (line 371) by shifting from a minus voltage to a plus voltage only during the time the code is being entered.

The last pulse from counter 318 triggers over lead 324 a further 4-step counter 326 which supplies four additional motor step pulses to the tape drive from pulse former 314, to move the tape clear of the recording head after recording of each code group corresponding to one character or function key operation. The blank 4-bit wide guard band on each side of a code sequence on the tape ensures that when erasure of codes is to be performed (as described below), adjacent codes will not be disturbed. In addition, the blank guard space allows the tape to reach a constant stepping speed before actual code recording or reading are performed, and during playback (reading) provides sufficient time for each printing cycle to be completed.

Coding for functions

Since, as stated, the function keys of keyboard 14 do not operate combinations of contacts, but only "make" one contact, the typical function key does two things. First, it initiates the complete counter operation as above described, over conductor 328, and it also energizes a particular input lead of a diode (or equivalent) coding matrix 330, via conductor 332. The combination of output circuits of the matrix, thus energized, is stored in code storage 304 over a group of leads symbolized at 334, just as in the case of a character key operation. Coding matrixes, as such, are familiar to those skilled in the data-handling art, and the details thereof are hence not described herein.

In the special case in which a particular printer operation requires an extended time for its completion, such as is the case for carrier return (and line feed) of a "Selectric" printer, or the paper-carriage-return operation of other typewriters, coding matrix 330 emits a special signal pulse over conductor 336 to a monostable multivibrator 338 having a restoration time greater than the maximum required for such particular extended printer-operating cycle. The aim here is to ensure that sufficient blank recorder tape follows such a group, as to allow the receiving printer, which it will later control, to operate completely before the next character (or other) operation is called for.

To this end, the pulse from conductor 336 flips the monostable 338 whose output operates relay 340 closing a feedback loop from counter 326 over lead 342 to counter 310 over lead 344. The counters fire one another in continuous succession, pulsing the pulse former 314 continually until multivibrator 338 restores itself in the known way; this steps the recorder tape an extended distance after the function code has been recorded thereon.

The time constant of multivibrator 338 is such to allow, for example, three complete cycles of the 16-bit stage array to occur every time a carrier-return function is coded. However, it is to be realized that unless additional provision is made to suppress the "start" pulses that normally are generated concurrently with the first recorded bit of a code, during these added cycles of counter stage operation, such a start pulse will be recorded on the tape at the beginning of each of the desired blank spaces following the recording of the carrier return code group. When these added start pulses are reproduced at the receiving end, they would initiate undesirable machine cycles and result in the printing or simulating of wrong characters; that is, at least one of the operating magnets of the receiving printer would be operated.

The supernumerary start pulses, following the actual recording of the carrier return code, are suppressed by the repeat-inhibit circuit 346, which is essentially a monostable multivibrator that is normally in a condition so that the inverting amplifier 348, which it controls, allows the start pulse from the first stage of ring counter 318 to be recorded over the channels 350 and 352 to recorder 28. When multivibrator 338 is flipped, as it will be upon operation of the carrier-return key of the keyboard, it also enables at 374 the multivibrator 346 which is triggered by the second counter 318 to inhibit 346, which now cuts off the amplifier 348 (or closes the gate) and thereafter, the start pulses from counter 318 are inhibited from reaching the recorder during repeated counter stage cycles. After the multivibrator 338 has restored itself to normal, the inhibit circuit 346 is also restored, opening the channel through inverting amplifier 348 and thereafter a start pulse will again be recorded coincident with the first bit of each subsequent code group. The multivibrator 346 is inhibited by line 374 during other operations so that pulses arriving on line 373 do not trigger it.

Recapitulating the foregoing, operation of keys of the typewriter at Station #1 causes the generation of code groups directly, where the keys operate a suitable number of switches or switch contacts, or indirectly via the coding matrix 330 when the keys call for functions that are not fully coded by the typewriter contacts. In either case, the final codes are put in serial form by the buffer storage 304 and passed, at properly timed intervals under the control of counter 318, to the tape recorder 28. The 4-step counters 310 and 326 provide for additional tape motion before and after the actual code-bit recording space, and in the case of a carirer-return code, the recycling arrangement involving multivibrator 338 also provides for added tape movement (free of start bits) following the recording of such code.

The code recording on the magnetic tape is not the recording of segments of tone frequencies, but rather on a DC basis by the recording of a magnetized condition as differentiated by an unmagnetized condition of each successive bit-space on the tape. The reading head of the recorder-reproducer 28, when it scans the recorded bit groups, controls a suitable amplifier 354 to provide the proper voltage levels for controlling the data-tone generator 38 which includes its own audio-tone generator in the known manner of operation of such devices. It is these tones, then, which are transmitted over the telephone channel to the receiver whose operation will now be described.

Reception of codes

When the tape which has been recorded as described above is to be employed for transmitting data to the receiving end of the channel, it is run through the recorder which is now conditioned to read the tape and generate output pulses corresponding to those originally recorded. The coded groups of output pulses are spaced as above described, and the first bit or mark pulse of each group signifies the start of a complte code that will ultimately call for operation of a character or function operation at a printer, or in a computer or the like. Two modes of operation are possible; one in which the received code groups directly control a typewriter, such as the input-output "Selectric" mentioned above, having a limited speed of operation; and another in which the received code groups are recorded at high speed, resulting from the operation of the tape machine at the transmitting end at a much higher speed than it had when it was being encoded. A third combination is possible, in which the codes, being received at the lower speed, can simultaneously control the reeciving typewriter directly, and also be recorded for later use, or retransmission, upon a storage tape.

Figure 4:
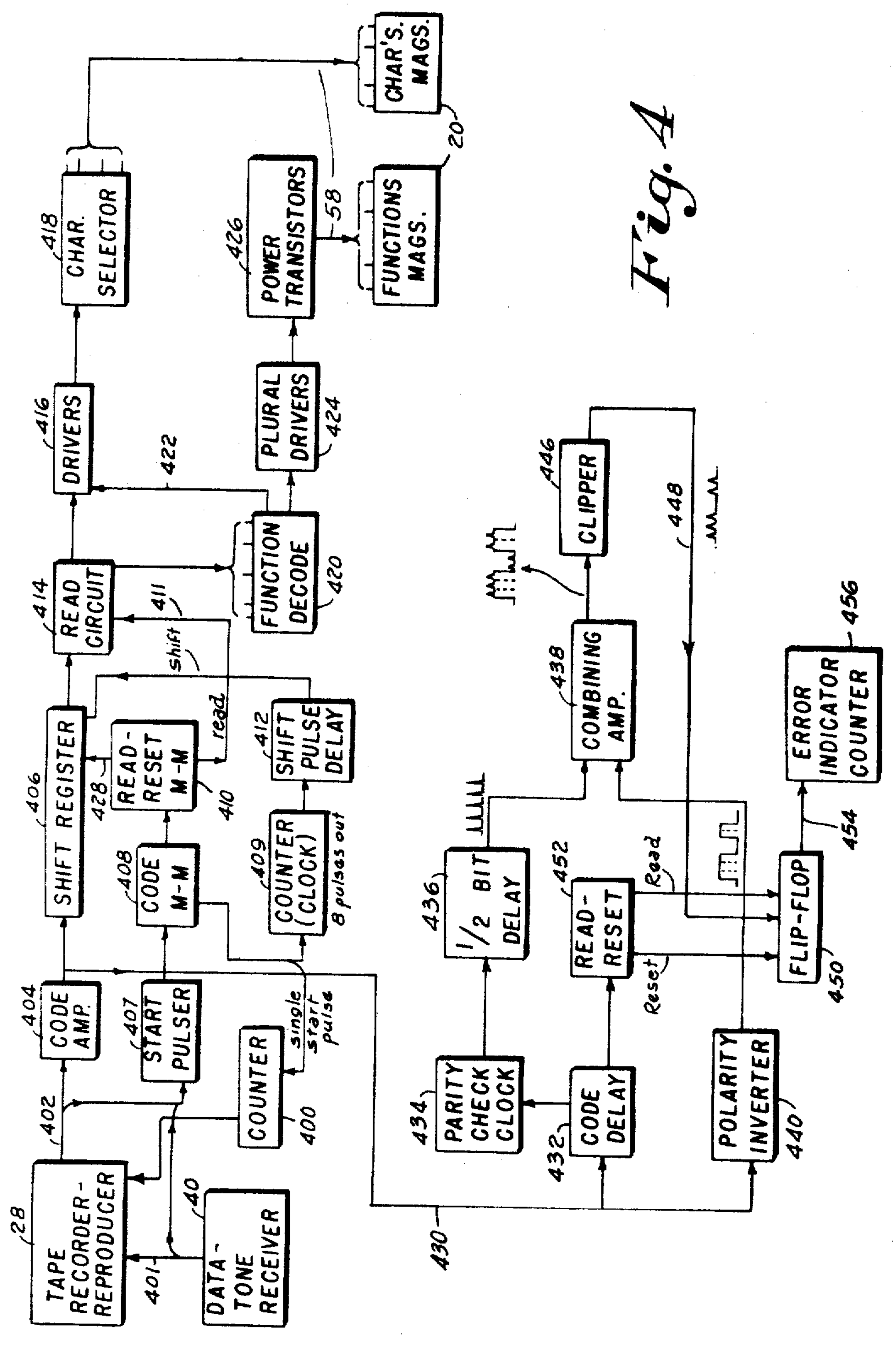
FIG. 4 is a diagram similar to FIG. 3 showing the receiving functions of the station.

Turning now to FIG. 4 of the drawings, the arrangement of the equipment at the receiving end is shown schematically. During the reception of codes transmitted from the data-tone unit 38 of FIG. 3, the received signals are applied to the data-tone unit 40, whose output is constituted by the production of significantly different DC potential levels on a pair of output conductors or contacts, these being symbolized by the conductor 401. Since these levels recur in time-serial form, they can be used directly to energize the recording head of the tape machine 28 at this end, which of course run at a speed commensurate with that at which the transmitting machine of FIG. 3 is being operated. Since the system is an asynchronous one, actual synchronism of tape speeds is not a requirement, the requirement being merely that the mark and space voltage levels which constitute the bits not be jammed too close together for accurate read-out, and not spaced apart so far that recording space is wasted. At the receiving end, a clockcounter 400 supplies the equivalent of synchronizing pulses to the tape recorder 28.

When the magnetic tape at the receiving end has recorded the entire message, the tape machine 28 is switched to its read-out or reproduce condition, and the tape reinserted for controlling the typewritter at that end of the circuit. The output voltage levels from the reading head are applied to conductor 402, amplified to suitable amplitude by amplifier 404, and applied to the input of shift register 406, which consists of eight flip-flop stages interconnected in the usual way to allow each stage to be set individualy in accordance with whether a mark or a space condition exists in each position of the tape as it passes over the reading head. The first pulse of each code group constitutes the "start" pulse, and is shaped in the start pulser 407 and applied to a monostable multivibrator 408 which acts as a delay circuit to prevent reading out of the stage conditions of the shift register before the code has been completely entered therein. The multivibrator 408 also furnishes a pulse to start the counter 409, which thereupon generates eight successive pulses which are respectively delayed by approximately one-half of a bit interval in the shift pulse delay circuit 412.

After the complete code group has had time to be entered in the shift register, the read-reset multivibrator 410 is energized as described above, and its output conditions the read-out circuit 414 whose inputs are connected to the respective stages of the shift register, so that the eight bits (mark or space conditions) are applied in time parallel (that is, simultaneously) to the driver amplifiers indicated at 416 and thence to the printer control amplifiers 418. These amplifiers are designated as "character selectors" at 418, and one such amplifier is connected to each of the character selecting magnets of the receiving typewriter.

When the read circuit 414 receives a code calling for a functional operation, as distinguished from a character selection, the combination energizes the appropriate driver 424 for the energization of the corresponding function-control magnet of the "Selectric" typewriter. In essence, the function-decode circuit is an "anding" circuit of seven stages which provides input to the drivers only when the proper bits for a function are present in the read circuit 414. The function decoding circuit 420 has an additional function, necessitated by the fact that, as stated above, the "Selectric" typewritter will go through a machine cycle if any of its magnets are energized for any reason, printing an erroneous character even if only a single bit is present. To prevent this result, the character-selecting operations are inhibited when a function code is sensed by the function decode circuit 420. An auxiliary voltage output of the circuit is applied at 422 to the driver circuits 416 when this happens, preventing them from causing outputs from the character selector amplifiers 418.

The proper character or function operation called for by the code group read from the tape machine 28 has thus been performed, and as the operate-time of the read-reset multivibrator 410 expires, the shift register 406 is reset (that is, all of its flip-flop stages are restored to a zero or space-bit condition) at 428 in preparation for the conversion of the next serial code-group into parallel form in the same way.

Parity check

FIG. 4 also diagrams the operation of checking each code group reproduced from recorder-reproducer 28 at the receiving station to give a signal alarm if the established parity (odd or even number of mark or "on" bits in each group) is violated. Such systems enable single-bit errors to be detected in a known manner, and the operation will be described on the basis that the selected code scheme uses an odd number of mark bits in each correct code group.

The code pulses from amplifier 404 are applied over lead 430 to the parity-check code delay circuit 432, a monostable circuit having a quasi stable period at least equal to the duration of a complete code group at the bit rate employed. The first or start pulse of each group also fires counter or clock 434 which releases a series of eight sharp positive-going pulses (one for each bit position of a code group) to the ½-bit delay circuit 436. The latter delivers these pulses to one input of a combining amplifier 438.

The code pulses from lead 430 are also applied to the polarity inverting amplifier 440 (since the output pulses of amplifier 404 are negative-going) which furnishes the second input to combining amplifier 438. Due to the ½-bit delay of circuit 436, each of the sharp pulses from it falls approximately at the mid-position of each bit interval of the code. Since the combining amplifier 438 adds the amplitude of the sharp sampling pulse to that of each code bit (O or +), the output level of the combining amplifier rises sharply at the instant corresponding to the center of each mark bit as indicated at 442. This center-sampling technique is required for bit-counting purposes because adjacent mark bits in the code group stand shoulder-to-shoulder without any separation (the same is true of adjacent space bits); hence individual mark-bit counting requires sampling at each bit interval.

Clipper 446 passes only the voltage level above the mark-condition level, hence only those spikes (originated by clock 434) which are riding upon mark bits, and not those riding upon space bits. These pulses are conveyed over lead 448 to a bistable flip-flop 450 whose output (flip or flop) will thus depend upon whether an odd or even number of pulses is supplied by clipper 446 during each pulse interval. The flip-flop 450 is reset to a specific one of its two states, after each code group, from the read-reset monostable multivibrator 452, which then after the delay introduced by 432, reads the flipped or flopped condition thereof resulting from the pulses produced at clipper 446. If the code has been properly received, and an odd number of mark bits is present, the flip-flop 450 will have no output at lead 454; if an output is present, an error will be signalled and/or counted at indicator 456.

Correction of keyboard errors

It will be recalled that, as shown in FIG. 2, the original magnetic tape record is prepared at the sending end by operation of a typewriter keyboard having a backspace key 70 which moves the type carrier in the direction opposite to that used in typing in the usual way. When an erroneous letter or character key is operated, it is desirable that the incorrect code group recorded on the magnetic tape be erased.

Figure 5:
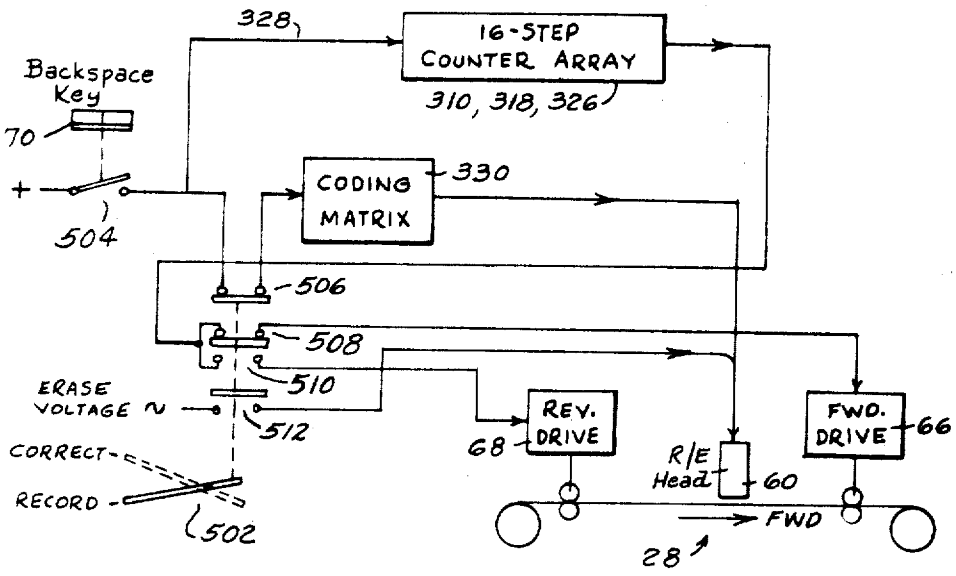
FIG. 5 is a diagram detailing the construction and operation of the correction circuit for the magnetic-tape recording and reproducing equipment of one station.

FIG. 5 illustrates how the system of the invention accomplishes this result. Since the backspace key 70 is a "function" key, its operation normally applies a voltage pulse to coding matrix 330 (of FIG. 3 also) to apply the proper code sequence to recording head 60 over the circuits 304, 306 of FIG. 3 which have not been duplicated in FIG. 5 to avoid complicating the drawing. In such normal backspace recording operations, the forward stepping drive 66 of the recorder tape would also be stepped 16 steps by the counter array 310, 318, 326.

For use when the typewriter carrier is backspaced to correct an error, FIG. 5 shows a correction switch 502 which, in its normal or "record" position, completes the circuit from the backspace key contacts 504 to the coding matrix over normally-closed contacts 506 of the switch. In this condition, also, contacts 508 of the switch apply the pulses from the counter array to the forward drive stepper 66 of the recorder.

When the correction switch 502 is thrown to its "correct" position, contacts 506 open, interrupting the path from contacts 504 to the matrix. However, operation of the backspace key still initiates the 16-step cycle of the counter array, over lead 328. The output of the counter is now directed to the reverse stepper drive 68 of the recorder, due to the closure of switch contacts 510 and the opening of its contacts 508. Finally, switch contacts 512 apply a source of erasing voltage to the erase-record head 60 of the recorder. In practice, the recorder may have a single capstan and bi-directional motor, only the direction-control wiring being reversed.

It follows that each operation of the backspace key, when the correction feature is in use, the tape back 16 steps and erases its clean of the corresponding code group. If an error lies several characters back in the typescript, the backspace key is operated the requisite number of times, and the correction switch then restored to its "record" position. The correct keys are then operated to record the proper codes upon the tape in the way already described.

Figure 6:
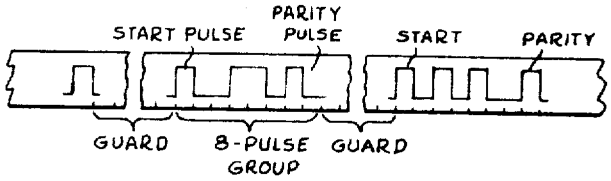
FIG. 6 is a schematic representation of a section of the record tape, illustrating the positioning of the code sequences thereon.

FIG. 6 illustrates schematically a typical section of record tape, the bits recorded thereon being shown as code pulse waveforms merely for clarity. As shown, the typical 8-bit sequence consists of a start pulse (always, for example, a "mark" pulse), followed by six code-determining bits which are selectively "mark" or "space" bits, and terminating in a parity-check bit which will be either a "mark" or "space" depending upon whether the center six bits include an odd or an even number of "mark" bits. The 4-bit length guard bands on each side of the 8-bit sequence are also shown.

While the invention has been described and illustrated herein in connection with a particular system embodiment chosen for purposes of clear exposition, it will be apparent to those skilled in the art that various changes and rearrangements can be effected without departing from the invention, and it is intended to include herein all such modifications as fall within the scope of the appended claims.

I claim:

1. In a data transmitting system:

(a) an input keyboard having both character selecting keys and function selecting keys,
(b) a multiple contact set controlled by each character selecting key and a single contact set controlled by each function key,
(c) a coding matrix controlled by each of said single contact sets,
(d) a coding storage device for sequentially storing codes selected by either said multiple contact sets or said coding matrices,
(e) a signal recorder, and
(f) gate means for conveying coding sequences stored in said storage means to said signal recorder,
(g) a multistage counter for emitting a timed sequence of pulses upon each energization of its input,
(h) means controlled by each of said keys for energizing the input of said counter,
(i) a counter feedback circuit from the output of said counter to its input to produce recycling of its stages,
(j) means controlled by one of said coding matrices for completing said feedback circuit for a predetermined period upon actuation of the corresponding function selecting key,
(k) means controlled by the output of said counter for advancing the recording medium of said signal recorder,
(l) means controlled by an intermediate stage of said counter for operating said gate means to convey the stored code sequence to said signal recorder during an intermediate portion of its recording medium motion, and (m) means for erasing individual characters on the magnetic tape by back-spacing from the keyboard.

2. In a data transmitting system:

(a) an input keyboard having both character selecting keys and function selecting keys, (b) a contact set controlled by each character selecting key and a contact set controlled by each function key, (c) a code storage device for sequentially storing codes selected by said contact sets, (d) a signal recorder, and (e) gate means for conveying coding sequences stored in said storage means to said signal recorder, (f) multistage counter for emitting a timed sequence of pulses upon each energization of its input, (g) means controlled by each of said keys for energizing the input of said counter, (h) a counter feedback circuit from the output of said counter to its input to produce recycling of its stages, (i) means controlled by one of said function key contact sets for completing said feedback circuit for a predetermined period upon actuation of the corresponding function selecting key, (j) means controlled by the output of said counter for advancing the recording medium of said signal recorder, and (k) means controlled by an intermediate stage of said counter for operating said gate means to convey the stored code sequence to said signal recorder during an intermediate portion of its recording medium motion.

3. A data transmiting system in accordance with claim 2, in which the said predetermined period has a duration several times as long as the recycling time of said counter.

4. In a data transmitting system:

(a) an input keyboard having selecting keys, (b) a contact set controlled by each of said selecting keys, (c) a code storage device for sequentially storing codes selected by said contact sets, (d) a signal recorder, and (e) gate means for conveying coding sequences stored in said storage means to said signal recorder, (f) a multistage counter for emitting a timed sequence of pulses upon each energization of its input, (g) means controlled by each of said keys for energizing the input of said counter, (h) means controlled by the output of said counter for advancing the recording medium of said signal recorder, (i) means controlled by an intermediate stage of said counter for operating said gate means to convey the stored code sequence to said signal recorder during an intermediate portion of its recording medium motion, and (j) means for erasing individual characters on the magnetic tape by back-spacing from the keyboard.

5. An interoffice data communicating system comprising a pair of terminal stations interconnected by a voice frequency telephone circuit, at least one of said terminal stations including:

(a) a moving carrier typewriter having (1) a selecting keyboard including a carrier backspacing control key, (2) code-group generating instrumentalities connected for control by said keyboard, and (3) circuit-selecting contacts operated by said keyboard;

(b) a selective-frequency audio tone generator connected to said telephone circuit for applying thereto coded tones corresponding to the energization of respective combinations of input conductors of said generator, (c) a stepping-type digital code magnetic tape recorder-reproducer including a bidirectional tape feed drive, input terminals for the recording of signals, and output terminals for the reproduction of recorded signals, (d) electronic signal processing circuits including a coding matrix connected to said circuit-selecting contacts for selectively energizing the input terminals of said recorder-reproducer, and for forward-energizing its tape feed drive, in accordance with the sequential operations of said keyboard, (e) a contact set operated by said backspacing control key, and a manually-operable control switch having one position in which it extends a first control circuit from said contact set to said recorder-reproducer to backward-energize its tape feed drive for each operation of said backspacing control key to allow correction of code groups erroneously recorded on the magnetic tape, (f) said manually-operable control switch having another position in which it interrupts said first control circuit and extends a second control circuit from said contact set to (1) said recorder-reproducer to forward-energize its tape feed drive, and to (2) said coding matrix so as to record a backspace code group on said magnetic tape, for each operation of said backspacing control key.

6. A system in accordance with claim 5, and switch means for selectively connecting either the input terminals of said recorder-reproducer to said telephone circuit, or the output terminals of said recorder-reproducer to said tone generator.

No references cited.

ROBERT L. GRIFFIN, *Primary Examiner.*

W. S. FROMMER, *Assistant Examiner.*